(12) United States Patent
Horiuchi et al.

(10) Patent No.: US 9,774,219 B2
(45) Date of Patent: *Sep. 26, 2017

(54) PERMANENT MAGNET, MOTOR AND ELECTRIC GENERATOR

(75) Inventors: Yosuke Horiuchi, Chigasaki (JP); Shinya Sakurada, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/366,834

(22) Filed: Feb. 6, 2012

(65) Prior Publication Data

US 2012/0146444 A1 Jun. 14, 2012

Related U.S. Application Data

(63) Continuation of application No. PCT/JP2009/003772, filed on Aug. 6, 2009.

(51) Int. Cl.
*H01F 7/02* (2006.01)
*H02K 1/02* (2006.01)
(Continued)

(52) U.S. Cl.
CPC ............... *H02K 1/02* (2013.01); *C22C 19/07* (2013.01); *C22F 1/10* (2013.01); *H01F 1/055* (2013.01);
(Continued)

(58) Field of Classification Search
CPC ....... H01F 1/0557; H01F 1/055; H01F 1/0596
(Continued)

(56) References Cited

U.S. PATENT DOCUMENTS 4,284,440 A * 8/1981 Tokunaga et al. ............ 420/435
4,746,378 A * 5/1988 Wysiekierski et al. ....... 148/101
(Continued)

FOREIGN PATENT DOCUMENTS

CA 2 659 088 A1 1/2008
CN 1954395 A 4/2007
(Continued)

OTHER PUBLICATIONS

English Machine Translation of JP 4764526 (Equivalent to WO 2009/145229 with a publication date of Mar. 12, 2009).*
(Continued)

*Primary Examiner* — Xiaowei Su
(74) *Attorney, Agent, or Firm* — Oblon, McClelland, Maier & Neustadt, L.L.P.

(57) ABSTRACT

In an embodiment, a magnet material includes a composition represented by $R(Fe_pM_qCu_r(Co_{1-a}A_a)_{1-p-q-r})_z$, where R is at least one element selected from rare earth elements, M is at least one element selected from Ti, Zr and Hf, A is at least one element selected from Ni, V, Cr, Mn, Al, Si, Ga, Nb, Ta, and W, p is $0.05 \leq p \leq 0.6$, q is $0.005 \leq q \leq 0.1$, r is $0.01 \leq r \leq 0.15$, a is $0 \leq a \leq 0.2$, z is $4 \leq z \leq 9$, and a structure including an intragranular phase having a $Th_2Zn_{17}$ crystal phase and a grain boundary phase. An average crystal grain diameter of the intragranular phase is in a range of 20 to 500 nm, and an average thickness of the grain boundary phase is smaller than a magnetic domain wall thickness.

18 Claims, 1 Drawing Sheet

(51) Int. Cl.
*C22C 19/07* (2006.01)
*C22F 1/10* (2006.01)
*H01F 1/055* (2006.01)
*H01F 1/059* (2006.01)
*H02K 1/27* (2006.01)

(52) U.S. Cl.
CPC ......... *H01F 1/0596* (2013.01); *H02K 1/2766* (2013.01); *C22C 2202/02* (2013.01)

(58) Field of Classification Search
USPC .......................................... 148/101–103, 303
See application file for complete search history.

(56) References Cited

U.S. PATENT DOCUMENTS

| | | | |
|---|---|---|---|
| 6,773,517 | B2 | 8/2004 | Sakaki et al. |
| 7,211,157 | B2 | 5/2007 | Sakaki et al. |
| 7,691,323 | B2 | 4/2010 | Sakaki et al. |
| 7,713,360 | B2 | 5/2010 | Ohashi |
| 7,790,300 | B2 | 9/2010 | Suzuki et al. |
| 2002/0054825 | A1* | 5/2002 | Sukaki et al. ................. 420/83 |
| 2007/0051431 | A1* | 3/2007 | Sakaki et al. ................. 148/105 |
| 2009/0261774 | A1 | 10/2009 | Yuuki et al. |

FOREIGN PATENT DOCUMENTS

| | | |
|---|---|---|
| EP | 1 187 147 A2 | 3/2002 |
| EP | 1 626 418 A2 | 2/2006 |
| EP | 2 048 772 A1 | 4/2009 |
| EP | 2 056 431 A1 | 5/2009 |
| JP | 52-096923 | 8/1977 |
| JP | 53-137022 | 11/1978 |
| JP | 57-196502 | 12/1982 |
| JP | 57-198228 | 12/1982 |
| JP | 62-260034 | 11/1987 |
| JP | 03-252103 | 11/1991 |
| JP | 06-020818 | 1/1994 |
| JP | 2002-083705 | 3/2002 |
| JP | 2002-083707 | 3/2002 |
| JP | 2005-243884 | 9/2005 |
| JP | 2008-029148 | 2/2008 |
| JP | 2008-043172 | 2/2008 |
| JP | EP 2 048 772 | * 4/2009 |
| JP | B2 4764526 | 9/2011 |
| WO | WO 2005/091315 | 9/2005 |
| WO | WO 2008/018354 | 2/2008 |
| WO | WO 2009/145229 | 12/2009 |

OTHER PUBLICATIONS

English Machine Translation of JP H06-212327.*
Mishra et al., Microstructure and Properties of Step Aged Rare Earth Alloy Magnets, Journal of Applied Physics, 52, 2517, 1981, pp. 2517-2519.*
Hadjipanayis et al. IEEE Transactions on Magnetics, 2000, vol. 36, p. 3382-3387.*
Huang et al. J of Applied Physics, 1994, vol. 75, p. 6280-6282.*
International Preliminary Report on Patentability and Written Opinion issued Mar. 13, 2012 in PCT/JP2009/003772 filed Aug. 6, 2009.
International Search Report issued Oct. 13, 2009 in PCT/JP2009/003772 filed Aug. 6, 2009.
Japanese Office Action in Japanese Patent Application No. 2011-525694, dated Apr. 9, 2013. (w/English Translation).
Office Action in Japanese application No. 2013-155408, mailed on Jun. 10, 2014. (w/English translation).
Office Action in Japanese Application No. 2013-155408, mailed on Dec. 2, 2014. (w/English Translation).

* cited by examiner

PERMANENT MAGNET, MOTOR AND ELECTRIC GENERATOR

CROSS-REFERENCE TO RELATED APPLICATION

This application is a continuation of prior International Application No. PCT/JP2009/003772, filed on Aug. 6, 2009; the entire contents of all of which are incorporated herein by reference.

FIELD

Embodiments described herein relate generally to a permanent magnet, a motor and an electric generator.

BACKGROUND

For variable magnetic flux motors and variable magnetic flux electric generators, a variable magnet and a stationary magnet are used. Conventionally, Al—Ni—Co based magnets and Fe—Cr—Co based magnets are used for the variable magnet. For example, the Al—Ni—Co based magnet has a coercive force of 150 kA/m or less. There are demands for a variable magnet having a coercive force of 200 to 500 kA/m in order to realize a more efficient variable magnetic flux motor or the like.

Sm—Co based magnets and Nd—Fe—B based magnets are known as high performance permanent magnets. Among the Sm—Co based magnets, a $Sm_2Co_{17}$ type magnet obtains a coercive force on the basis of a fine structure which is called a cell structure that has a 1-5 type crystal phase precipitated in a grain boundary of a 2-17 type crystal phase. The magnet domain wall of the $Sm_2Co_{17}$ type magnet has a thickness of about 2 to 10 nm, bur a conventional 1-5 type crystal phase (grain boundary phase) has a thickness of about several tens nm, so that the coercive force is increased by pinning of the magnetic domain wall. For example, the coercive force of the $Sm_2Co_{17}$ type magnet is 1430 kA/m at the maximum. Therefore, it cannot be used as a variable magnet.

DETAILED DESCRIPTION

According to one embodiment, there is provides a permanent magnet including a composition represented by a composition formula:

$$R(Fe_pM_qCu_r(Co_{1-a}A_a)_{1-p-q-r})_z \quad (1)$$

where, R is at least one element selected from rare earth elements, M is at least one element selected from Ti, Zr and Hf, A is at least one element selected from Ni, V, Cr, Mn, Al, Si, Ga, Nb, Ta and W, p is a number (atomic ratio) satisfying 0.05≤p≤0.6, q is a number (atomic ratio) satisfying 0.005≤q≤0.1, r is a number (atomic ratio) satisfying 0.01≤r≤0.15, a is a number (atomic ratio) satisfying 0≤a≤0.2, z is a number (atomic ratio) satisfying 4≤z≤9, and a structure including an intragranular phase having a $Th_2Zn_{17}$ crystal phase and a grain boundary phase. In the permanent magnet, the intragranular phase has an average crystal grain diameter in a range of 20 to 500 nm, and the grain boundary phase has an average thickness smaller than a magnetic domain wall thickness. Alternatively, when a concentration of the element M in a region having a radius of 2 nm is measured in a cross section including axis c of the $Th_2Zn_{17}$ crystal phase, a ratio (M2/M1) of a concentration M2 of the element M in a region in which the concentration of the element M is highest, to a concentration M1 of the element M in a region in which the concentration of the element M is lowest, is 2 or less.

In the composition formula (1), at least one element selected from rare earth elements including yttrium (Y) is used as the element R. The element R provides a large magnetic anisotropy to the magnet material to give a high coercive force. As the element R, at least one selected from samarium (Sm), cerium (Ce), neodymium (Nd) and praseodymium (Pr) is used preferably, and it is particularly desirable to use the Sm. The performance of the permanent magnet, and particularly the coercive force, can be enhanced reproducibly by determining the Sm to make up 50 at. % or more of the element R. In addition, it is desirable that 70 at. % or more of the element R is the Sm.

The element R is blended so that its atomic ratio with respect to other elements (Fe, M, Cu, Co, and A) is in a range of 1:4 to 1:9 (a range of 4 to 9 as value z/a range of 10 to 20 at. % as the content of the element R). If the content of the element R is less than 10 at. %, a large amount of an α-Fe phase precipitates, and a sufficient coercive force cannot be obtained. If the content of the element R exceeds 20 at. %, a saturation magnetization is decreased considerably. The content of the element R is preferably determined to be in a range of 10 to 15 at. %, and more preferably in a range of 10.5 to 12.5 at. %.

As the element M, at least one element selected from titanium (Ti), zirconium (Zr) and hafnium (Hf) is used. When the element M is blended, large coercive force can be exhibited by a composition having a high iron concentration. The content of the element M is determined to be in a range of 0.5 to 10 at. % (0.005≤q≤0.1) of a total amount of elements (Fe, Co, Cu, and M) other than the element R. If value q exceeds 0.1, magnetization is decreased considerably. If the value q is less than 0.005, an effect of enhancing the iron concentration is small. The content of the element M is preferably 0.01≤q≤0.06, and more preferably 0.015≤q≤0.04.

The element M may be any of Ti, Zr and Hf, and it is preferable to contain at least Zr. The effect of enhancing the coercive force of the permanent magnet can be further improved by having 50 at. % or more of the Zr in the element M. When the Hf is used, its used amount is preferably decreased because the Hf is particularly expensive among the element M. The content of the Hf is desirably less than 20 at. % in the element M.

Copper (Cu) is an element essential for making the permanent magnet exhibit a high coercive force. The blending amount of the Cu is determined to be in a range of 1 to 15 at. % (0.01≤r≤0.15) of a total amount of the elements (Fe, Co, Cu, and M) other than the element R. When the value r exceeds 0.15, a decrease in magnetization is considerable. When the value r is less than 0.01, it becomes difficult to obtain a high coercive force. The blending amount of the Cu is preferably 0.02≤r≤0.1, and more preferably 0.03≤r≤0.08.

Iron (Fe) serves mainly a magnetization of the permanent magnet. When a large amount of Fe is blended, the saturation magnetization of the permanent magnet can be enhanced. When the Fe content becomes excessively large, the α-Fe phase is precipitated, and it becomes difficult to obtain a two-phase texture of an intragranular phase having a 2-17 type crystal phase and a grain boundary phase. Therefore, the coercive force of the permanent magnet is decreased. The blending amount of Fe is determined to be in a range of 5 to 60 at. % ($0.05 \leq p \leq 0.6$) of a total amount of the elements (Fe, Co, Cu and M) other than the element R. The blending amount of Fe is preferably $0.26 \leq p \leq 0.5$, and more preferably $0.28 \leq p \leq 0.48$.

Cobalt (Co) is an element to serve a magnetization of the permanent magnet and to exhibit a high coercive force. In addition, when the Co is contained in a large amount, a Curie temperature becomes high, and the thermal stability of the permanent magnet is also improved. When the blending amount of the Co is small, the above effects are reduced. But, when the Co is contained in an excessively large amount in the permanent magnet, the content of Fe is relatively decreased, and magnetization might be decreased. The content of the Co is determined to be in a range of (1-p-q-r) defined by p, q and r.

The Co may be partially substituted by at least one element selected from nickel (Ni), vanadium (V), chromium (Cr), manganese (Mn), aluminum (Al), silicon (Si), gallium (Ga), niobium (Nb), tantalum (Ta) and tungsten (W). These substitution elements serve to improve the magnet characteristics such as a coercive force. But, since excessive substitution might decrease magnetization, the substitution amount is determined to be 20 at. % or less ($0 \leq a \leq 0.2$) of the Co.

The $Sm_2Co_{17}$ type magnet is provided with the magnetic characteristics based on a coercive force generating mechanism of a magnetic domain wall pinning type by having as a precursor a $TbCu_7$ crystal phase (1-7 type crystal phase), which is a high temperature phase, and applying aging heat treatment to it to perform phase separation into a $Th_2Zn_{17}$ crystal phase (2-17 type crystal phase) and a $CaCu_5$ crystal phase (1-5 type crystal phase). The 2-17 type crystal phase becomes an intragranular phase (main phase), and the 1-5 type crystal phase (grain boundary phase) is precipitated in its grain boundary to separate the intragranular phase to form a secondary structure which is called a cell structure. By spinodal decomposition, the 1-5 type crystal phase becomes a Cu-rich and Fe-poor phase, while the 2-17 type crystal phase becomes a Cu-poor and Fe-rich phase.

The coercive force in the $Sm_2Co_{17}$ type magnet originates from a fine structure generated by the phase decomposition. A magnetic domain wall thickness of the $Sm_2Co_{17}$ type magnet is considered to be variable depending on whether the magnetic domain wall is in the 1-5 type crystal phase, the 2-17 type crystal phase, or in a region including the both phases. It is known that the magnetic domain wall thickness of the 1-5 type crystal phase is generally 2 to 5 nm, and the magnetic domain wall thickness of the 2-17 type crystal phase is about 10 nm. Therefore, the magnetic domain wall thickness of the $Sm_2Co_{17}$ type magnet is considered to become about 2 to 10 nm. Since the thickness of the 1-5 type crystal phase (grain boundary phase) is about several tens nm, the conventional $Sm_2Co_{17}$ type magnet generates a large coercive force based on a pinning force of the magnetic domain wall. Then, it cannot be used as a variable magnet.

The metal texture of the $Sm_2Co_{17}$ type magnet depends largely on a production process. For example, in the aging heat treatment, heat treatment is performed at a temperature in a range of about 750 to 900° C., controlled cooling is then performed, and quenching is performed after cooling down to a prescribed temperature. If a cooling end temperature is excessively high, interdiffusion of each component element becomes insufficient, and the 1-5 type crystal phase does not come to have a perfect plate wall shape but a brick wall shape having a gap. The magnetic domain wall is considered to pass through the gap, and the above-described magnetic domain wall pinning type coercive force generating mechanism does not function. If the cooling end temperature is excessively low, the 1-5 type crystal phase develops excessively, resulting in exerting a great coercive force.

A first embodiment realizes a coercive force smaller than that of a conventional $Sm_2Co_{17}$ type magnet by making the average thickness of the grain boundary phase smaller than the magnetic domain wall thickness in a permanent magnet which has a two-phase separated texture of an intragranular phase (main phase) having a 2-17 type crystal phase and a grain boundary phase. The permanent magnet according to the first embodiment has a coercive force in a range of 200 to 500 kA/m. If the coercive force of the permanent magnet exceeds 500 kA/m, its use as a variable magnet becomes difficult. If the coercive force is less than 200 kA/m, the variable magnet cannot be provided with high performance. It is preferable that the coercive force of the permanent magnet is in a range of 200 to 400 kA/m.

In the permanent magnet of the first embodiment, the intragranular phase (crystalline grains) composed of the 2-17 type crystal phase has an average crystal grain diameter in a range of 20 to 500 nm. If the average crystal grain diameter of the intragranular phase is less than 20 nm, magnetization is decreased, and the characteristics as the permanent magnet cannot be obtained. If the average crystal grain diameter of the intragranular phase exceeds 500 nm, the coercive force lowers. It is preferable that the average crystal grain diameter of the intragranular phase which is composed of the 2-17 type crystal phase is in a range of 30 to 300 nm. The grain boundary phase is a phase which is present in a plate-like form among (in the crystal grain boundary) the intragranular phases (crystalline grains), and has an average thickness smaller than the magnetic domain wall thickness.

The thickness of the grain boundary phase is a width of a region having a different contrast between the crystalline grain having a uniform contrast and the adjacent crystalline grain having a uniform contrast in an image obtained through a transmission electron microscope (TEM). The average thickness of the grain boundary phase shall represent an average value of five measured widths of the above regions having a different contrast in the TEM images magnified to 100 k to 200 k times. The magnetic domain wall thickness can be directly observed by a Lorentz TEM. The magnetic domain wall thickness is measured at five points on the Lorentz TEM image magnified to 100 k to 200 k times and their average value should be shown.

If the average thickness of the grain boundary phase is smaller than the magnetic domain wall thickness, a magnetic domain wall pinning effect by the grain boundary phase is weakened, so that it becomes possible to obtain an appropriate coercive force, namely a coercive force in a range of 200 to 500 kA/m suitable for a variable magnet. The average thickness of the grain boundary phase is preferably 10 nm or less. If the average thickness of the grain boundary phase exceeds 10 nm, the magnetic domain wall pinning effect is enhanced, and a large coercive force is easily exhibited similar to the conventional $Sm_2Co_{17}$ type magnet. The average thickness of the grain boundary phase is more preferably 8 nm or less, and still more preferably 5 nm or less. But, if the average thickness of the grain boundary phase is excessively small, the magnetic domain wall pinning effect becomes excessively weak, and there is a possibility that the coercive force decreases excessively. Therefore, the average thickness of the grain boundary phase is preferably 1 nm or more.

As a phase configuring the grain boundary phase, there is, for example, a $CaCu_5$ crystal phase (1-5 type crystal phase), but not exclusive. The 1-5 type crystal phase is largely different in magnetic domain wall energy from the 2-17 type crystal phase, so that its effect of pinning the migration of the magnetic domain wall is intense. The permanent magnet of this embodiment obtains an appropriate coercive force by weakening the pinning force of the magnetic domain wall by the grain boundary phase, so that the grain boundary phase may not be a phase which has a large force of pinning the magnetic domain wall similar to the 1-5 type crystal phase. The grain boundary phase may be a phase (Cu-rich phase) which is made to have Cu more than in the intragranular phase composed of the 2-17 type crystal phase. Specifically, it is appropriate when a ratio (C2/C1) of a Cu concentration (C2) of the grain boundary phase to a Cu concentration (C1) of the intragranular phase is 1.2 or more.

A phase (Cu-rich phase), which has Cu enriched, is positioned as a grain boundary phase among the intragranular phase (crystalline grains) composed of the 2-17 type crystal phase, so that an appropriate coercive force can be exerted based on a magnetic domain wall energy difference generated between the intragranular phase and the grain boundary phase. The coercive force based on the magnetic domain wall energy difference between the intragranular phase and the grain boundary phase can be obtained when the ratio (C2/C1) of the Cu concentration (C2) of the grain boundary phase to the Cu concentration (C1) of the intragranular phase is 1.2 or more. If the Cu ratio (C2/C1) between the intragranular phase and the grain boundary phase is less than 1.2, the magnetic domain wall energy difference becomes excessively small, and the coercive force might decrease excessively.

As the Cu-rich phase configuring the grain boundary phase, there is a precursor phase of the 1-5 type crystal phase, which is generated in the initial stage of the two-phase separation of a high-temperature phase (1-7 type crystal phase), other than the 1-5 type crystal phase. The precursor phase of the 1-5 type crystal phase is considered to be mainly the 1-7 type crystal phase or a mixed phase of the 1-7 type crystal phase and the 1-5 type crystal phase. Thus, the grain boundary phase which is made present in the grain boundary of the intragranular phase composed of the 2-17 type crystal phase may be a Cu-rich phase, in which a Cu concentration ratio (C2/C1) of the intragranular phase and the grain boundary phase is 1.2 or more, similar to the 1-5 type crystal phase, the 1-7 type crystal phase, and the mixed phase of them.

As described above, the source of the coercive force in the $Sm_2Co_{17}$ type magnet is in the phase separation of the 1-5 type crystal phase and the 2-17 type crystal phase with the 1-7 type crystal phase used as a precursor during the aging treatment. The 1-7 type crystal phase of the phase separation precursor causes to generate a plate-like phase (platelet phase) in the preceding step of the phase separation. The platelet phase is a phase that the element M represented by Zr is rich, and remains even after the phase separation. It is presumed that the platelet phase serves as a path for interdiffusion between the individual phases of the 2-17 type crystal phase and the 1-5 type crystal phase in a controlled cooling process, which is subsequently performed after the phase separated texture which is formed by the aging treatment is determined, and assists migration of the elements such as Fe, Cu and the like.

The platelet phase generates in parallel to plane c ((0001) plane) of the 2-17 type crystal phase which is the main phase. Therefore, when a fine texture of a cross section including axis c of the 2-17 type crystal phase of the $Sm_2Co_{17}$ type magnet after the aging heat treatment is observed, the cross section of the platelet phase is observed in streak form substantially at a right angle to the axis c. Since the M-rich platelet phase serves as the diffusion path for the elements such as Fe, Co, Cu and the like, it promotes the phase separation during the aging treatment. Therefore, it becomes a phase essential for causing the $Sm_2Co_{17}$ type magnet to exert a sufficient coercive force.

For example, in an $Sm_2Co_{17}$ type magnet having a coercive force exceeding 500 kA/m, a clear M-rich platelet phase, specifically a Zr-rich platelet phase, is recognized in a cross section including the axis c of the 2-17 type crystal phase. In other words, in a cross section including the axis c of the 2-17 type crystal phase, there is recognized a region in which the Zr concentration is higher by two times or more in comparison with the Zr concentration of the intragranular phase. This high Zr concentration region is a Zr-rich platelet phase. Meanwhile, such a clear Zr-rich region (region in which the Zr concentration is two times higher than the Zr concentration of the intragranular phase) is not recognized in the $Sm_2Co_{17}$ type magnet whose coercive force is small.

As described above, the metal texture of the $Sm_2Co_{17}$ type magnet depends strongly on the production process, and the structure of the grain boundary phase depends on the controlled cooling conditions after isothermal treatment in the aging treatment. On the other hand, the structure and element composition ratio of the Zr-rich platelet phase depend on the isothermal treatment conditions of the initial stage of the aging treatment. If the isothermal treatment temperature is excessively high, the Zr-rich platelet phase develops excessively, an enormous coercive force is generated, and magnetization might be decreased. Meanwhile, if the isothermal treatment temperature is excessively low, the Zr-rich platelet phase is not generated at all, and the phase separation does not proceed, so that the coercive force might become very small. The same shall apply when Ti or Hf is used instead of Zr.

A second embodiment is determined that a cross section including axis c of the 2-17 type crystal phase does not have a plate-like phase (M-rich platelet phase) having a clear element M enriched in a permanent magnet which is provided with a two-phase separated texture of an intragranular phase (main phase) having a 2-17 type crystal phase and a grain boundary phase. Thus, it becomes possible to realize a coercive force smaller than the conventional $Sm_2Co_{17}$ type magnet similar to the first embodiment. The permanent magnet according to the second embodiment has a coercive force in a range of 200 to 500 kA/m similar to the first embodiment. The coercive force of the permanent magnet according to the second embodiment is preferably in a range of 200 to 400 kA/m.

By preventing the generation of the clear M-rich platelet phase, the amount and velocity of interdiffusion of each element having the platelet phase as a diffusion path can be suppressed. Thus, the phase separation from the 1-7 type crystal phase to the 2-17 type crystal phase and the 1-5 type crystal phase is suppressed, so that the expression of the coercive force which is seen in the conventional $Sm_2Co_{17}$ type magnet can be suppressed. In addition, the thickness of the Cu-rich grain boundary phase, which is considered to be composed of the 1-5 type crystal phase and its precursor phase, is prevented from increasing excessively, and the coercive force is also suppressed from increasing from the same viewpoint. Thus, the suppression of the M-rich platelet phase is also effective on the permanent magnet according to the first embodiment. It is also preferable that the permanent magnet of the first embodiment does not have a clear M-rich platelet phase.

Since an amount of Fe in the M-rich platelet phase is small in comparison with the 2-17 type crystal phase which is the main phase after the aging treatment, magnetization is decreased. If the M-rich platelet phase remains in a large amount even after the aging treatment, the magnetization might be decreased. Thus, the generated amount of the M-rich platelet phase is preferably small from a viewpoint of both the control of coercive force and the maintenance of magnetization, and it is desired to form a texture in which the clear M-rich platelet phase is not present. That is, it becomes possible to realize a permanent magnet having an appropriate coercive force without involving a noticeable decrease in magnetization by preventing the presence of the clear M-rich platelet phase.

The M-rich platelet phase can be judged according to a deviation of the concentration of the element M in a cross section including axis c of the 2-17 type crystal phase. Specifically, when the concentration of the element M in a region having a radius of 2 nm is measured in the cross section including the axis c of the 2-17 type crystal phase, a ratio (M2/M1) of a concentration (M2) of the element M in a region where the concentration of the element M is highest to a concentration (M1) of the element M in a region where the concentration of the element M is lowest is determined to be 2 or less. Thus, it becomes possible to obtain a coercive force suitable for the variable magnet. In other words, when the M2/M1 ratio is 2 or less, it can be judged that the generation of the M-rich platelet phase is suppressed.

The concentration of the element M is determined by performing composition analysis of a region having a radius of 2 nm in a TEM image magnified to 100 k to 200 k times. EDX or the like is used for the composition analysis. The M2/M1 ratio is determined from a ratio of the concentrations M1 and M2 by performing the above-described composition analysis on arbitrary 50 points, and determining that a concentration of the element M in a region, where the concentration of the element M is highest, is M1, and a concentration of the element M in a region, where the concentration of the element M is lowest, is M2.

If the M2/M1 ratio exceeds 2, magnetization decreases because of the M-rich platelet phase, and interdiffusion of individual elements having the M-rich platelet phase as the diffusion path is promoted. As a result, the thickness of the grain boundary phase is increased, and the coercive force becomes enormous easily. The M2/M1 ratio is preferably 1.8 or less, and more preferably 1.6 or less. According to the permanent magnet in which the concentration ratio (M2/M1) of the element M is 2 or less, an appropriate coercive force effective for a variable magnet can be realized without involving a noticeable decrease in magnetization.

In the permanent magnet of the second embodiment, the intragranular phase (crystalline grains) composed of the 2-17 type crystal phase has preferably an average crystal grain diameter in a range of 20 to 500 nm. The grain boundary phase is not limited to the 1-5 type crystal phase but may be its precursor phase (1-7 type crystal phase, a mixed phase of the 1-5 type crystal phase and the 1-7 type crystal phase or the like). The grain boundary phase may be a Cu rich phase in which its Cu concentration (C2) is 1.2 times or more (2≤C2/C1) of the Cu concentration (C1) of the intragranular phase. The intragranular phase and the grain boundary phase can be measured for the Cu concentration similar to the concentration of the element M.

The permanent magnet of this embodiment is produced as follows. First, an alloy powder containing predetermined amounts of elements is produced. The alloy powder is prepared by for example producing a thin alloy strip in flake form by a strip casting method or the like and pulverizing it. According to the strip casting method, it is preferable to obtain a thin strip continuously solidified to have a thickness of 1 mm or less by pouring the molten alloy to a cooling roll rotating at a circumferential velocity of 0.1 to 20 m/sec. If the cooling roll has a circumferential velocity of less than 0.1 m/sec, the thin strip tends to have variations in its composition, and if the circumferential velocity exceeds 20 m/sec, the crystal grains are miniaturized into a single-domain size or less, and good magnetic characteristics cannot be obtained. The circumferential velocity of the cooling roll is more preferably in a range of 0.3 to 15 m/sec, and still more preferably in a range of 0.5 to 12 m/sec.

The alloy powder may be prepared by crushing the alloy ingot or the like obtained by casting the molten metal by an arc melting method or a high-frequency melting method. Other Methods of preparing the alloy powder include a mechanical alloying method, a mechanical grinding method, a gas atomizing method, a reduction and diffusion method and the like, and the alloy powders prepared by the above methods may be used. The alloy powder obtained as described above or the alloy before crushing may be homogenized by a thermal treatment, if necessary. The flake or the ingot is crushed by a jet mill, a ball mill, or the like. The crushing is preferably performed in an inert gas atmosphere or an organic solvent to prevent the alloy powder from being oxidized.

The alloy powder is then filled in a mold which is disposed in an electromagnet or the like and undergone pressure forming while applying a magnetic field to form a green compact with crystal axes oriented. The green compact is sintered at a temperature of 1100 to 1300° C. for 0.5 to 15 hours to obtain a dense sintered body. If the sintering temperature is less than 1100° C., the density of the sintered body becomes insufficient, and if it exceeds 1300° C., the rare earth element such as Sm evaporates, and good magnetic characteristics cannot be obtained. The sintering temperature is more preferably in a range of 1150 to 1250° C., and still more preferably in a range of 1180 to 1230° C.

If the sintering time is less than 0.5 hour, the density of the sintered body might become uneven. If the sintering time exceeds 15 hours, the rare earth element such as Sm evaporates, and good magnetic characteristics cannot be obtained. The sintering time is more preferably in a range of 1 to 10 hours, and still more preferably in a range of 1 to 4 hours. It is preferable that the green compact is sintered in vacuum or an inert gas atmosphere of an argon gas or the like to prevent it from being oxidized.

The obtained sintered body is subjected to solution heat treatment and aging heat treatment to control the crystal texture. The solution heat treatment is performed preferably at a temperature in a range of 1130 to 1230° C. for 0.5 to 8 hours to obtain a 1-7 type crystal phase which is a precursor of a phase separated texture. If the temperature is less than 1130° C. or exceeds 1230° C., a ratio of the 1-7 type crystal phase in a sample after the solution heat treatment is small, and good magnetic characteristics cannot be obtained. The solution heat treatment temperature is more preferably in a range of 1150 to 1210° C., and still more preferably in a range of 1160° C. to 1190° C.

If the solution heat treatment time is less than 0.5 hour, the constituent phase tends to become ununiform. And, if the solution heat treatment is performed more than 8 hours, the rare earth element such as Sm in the sintered body is evaporated, and good magnetic characteristics might not be obtained. The solution heat treatment time is more preferably in a range of 1 to 8 hours, and still more preferably in a range of 1 to 4 hours. The solution heat treatment is preferably performed in vacuum or in an inert gas atmosphere of argon gas or the like to prevent oxidation.

The aging heat treatment holds at a temperature in a range of 700 to 900° C. for 0.5 to 8 hours, cools slowly to a cooling end temperature in a range of 400 to 650° C. at a cooling rate of 0.2 to 2° C./min, and subsequently cools down to room temperature by cooling the furnace. If the aging heat treatment temperature is less than 700° C. or exceeds 900° C., a mixed phase of a homogeneous grain boundary phase and a 2-17 type crystal phase cannot be obtained, and the magnetic characteristics are degraded. If the aging heat treatment temperature exceeds 900° C., an M-rich platelet phase is produced excessively, the coercive force becomes enormous, and magnetization is decreased. The aging heat treatment temperature is more preferably in a range of 750 to 900° C., and still more preferably in a range of 800 to 880° C.

If the aging heat treatment time is less than 0.5 hour, the produced amount of the M-rich platelet phase is insufficient, and interdiffusion does not proceeds sufficiently, so that the grain boundary phase is not precipitated sufficiently from the 1-7 phase. If the aging heat treatment time exceeds 8 hours, the grain boundary phase thickness increases, the coercive force becomes enormous, and the magnet characteristics suitable for the variable magnet cannot be obtained. And, good magnetic characteristics cannot be obtained because of coarsening of the crystal grains, or the like. It is determined that the aging heat treatment time is more preferably in a range of 1 to 6 hours, and still more preferably in a range of 2 to 4 hours.

It is preferable that the cooling rate is in a range of 0.2 to 2° C./min. If the cooling rate is less than 0.2° C./min, the grain boundary phase thickness increases, so that the coercive force becomes enormous. And, good magnetic characteristics cannot be obtained because of coarsening of the crystal grains or the like. Meanwhile, if the cooling rate exceeds 2° C./min, the mixed phase of a homogeneous grain boundary phase and a 2-17 type crystal phase cannot be obtained, and magnetic characteristics are degraded. The cooling rate is more preferably in a range of 0.4 to 1.5° C./min, and still more preferably in a range of 0.5 to 1.3° C./min. It is preferable that the aging heat treatment is performed in vacuum or an inert gas atmosphere of an argon gas or the like to prevent oxidation. The above crystal texture control is important to control the coercive force of the magnet and to prevent magnetization from degrading.

The permanent magnet of this embodiment is suitable as a variable magnet. The permanent magnet of this embodiment is used as the variable magnet to configure the variable magnetic flux motor and the variable magnetic flux electric generator. The technologies disclosed in the related arts are applied to the structure and the drive system of the variable magnetic flux motor. By using the permanent magnet of this embodiment as the variable magnet of the variable magnetic flux drive system, the system can be made to be highly efficient, compact, and inexpensive.

Figure 1:
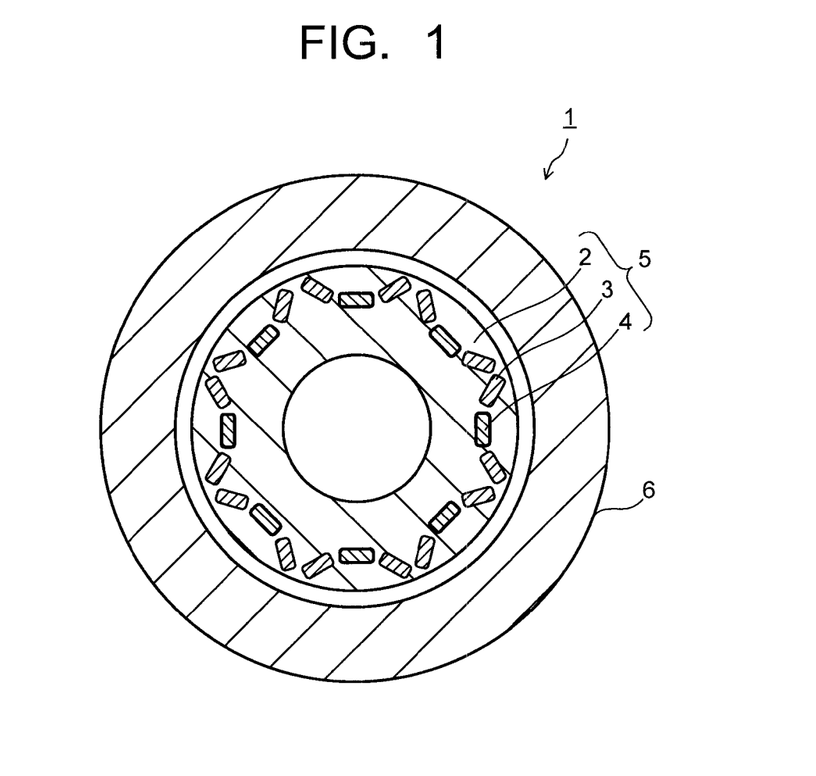
FIG. 1 is a view showing a variable magnetic flux motor according to an embodiment.
Figure 2:
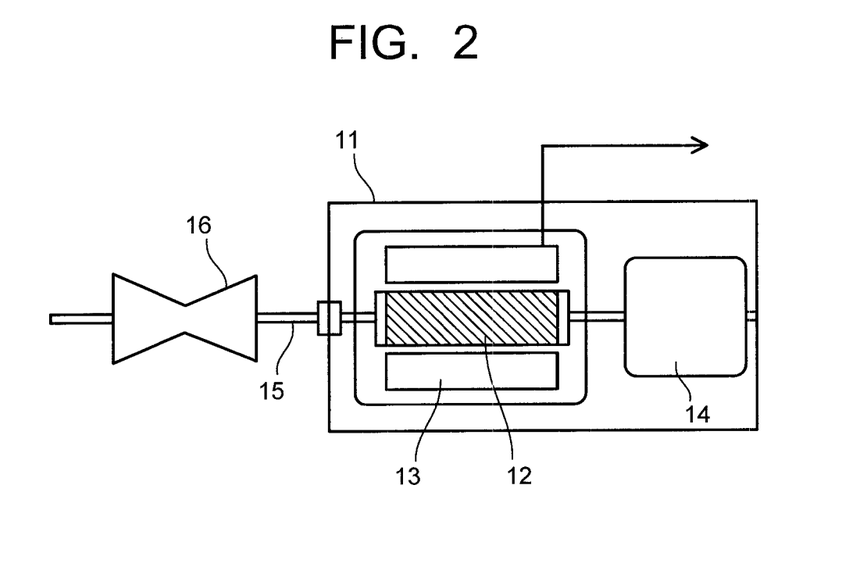
FIG. 2 is a view showing a variable magnetic flux electric generator according to an embodiment.

As shown in FIG. 1, a variable magnetic flux motor 1 is provided with a rotor 5, which has stationary magnets 3 and variable magnets 4 arranged in a core 2, and a stator 6 having the same structure as that of a conventional motor. As shown in FIG. 2, a variable magnetic flux electric generator 11 is provided with a rotor coil 12 having stationary magnets and variable magnets, a stator coil 13 and a brush 14. The variable magnetic flux electric generator 11 operates to generate power by rotating a shaft 15 mounted on the rotor coil 12 by a turbine 16.

Specific examples relating to the embodiments and their evaluated results are described below.

Examples 1 to 3

Ingots obtained by arc-melting individual raw materials in an Ar gas atmosphere were heated at 1170° C. for 1 hour. Each alloy was coarsely crushed and then finely ground by a jet mill to prepare an alloy powder. The alloy powder was pressed in a magnetic field to make a green compact, which was then sintered in an Ar gas atmosphere at 1190° C. for 3 hours, and subsequently heated at 1170° C. for 3 hours to produce a sintered body. The obtained sintered body was held at 850° C. for 4 hours, and cooled slowly to 600° C. at a cooling rate of 1.2° C./min to obtain a target sintered magnet. The compositions of the sintered magnets produced in Examples 1 to 3 are as shown in Table 1. The composition of each magnet was confirmed by an ICP method.

Textures (the produced phases after the aging heat treatment) of the sintered magnets produced as described above were undergone TEM observation to find that all of them had a two-phase separated texture of an intragranular phase having a 2-17 type crystal phase and a grain boundary phase. The intragranular phase and the grain boundary phase were measured for Cu concentration to find that a ratio of Cu concentration (C2) of the grain boundary phase to Cu concentration (C1) of the intragranular phase was 1.2 or more. These sintered magnets were subjected to the characteristic evaluation to be described later.

Comparative Example 1

A sintered body was produced under the same conditions as in Example 2 by using the alloy powder having the same composition as in Example 2. The sintered body was held at 850° C. for 10 hours and cooled slowly to 400° C. at a cooling rate of 0.8° C./min to produce a sintered magnet.

Examples 4 to 7

Ingots obtained by arc-melting individual raw materials in an Ar gas atmosphere were put into individual quartz nozzles and melted by applying high frequency induction heating. Each molten metal was poured onto a cooling roll rotating at a circumferential velocity of 0.6 m/sec to produce a thin strip by continuously solidifying. The thin strip was coarsely crushed and then finely ground by a jet mill to prepare an alloy powder. The alloy powder was pressed in a magnetic field to prepare a green compact, which was then sintered in an Ar gas atmosphere at 1200° C. for one hour, and subsequently heated at 1180° C. for four hours to produce a sintered body. The obtained sintered body was held at 850° C. for 3 hours and cooled slowly to 650° C. at a cooling rate of 1.3° C./min to produce a target sintered magnet. The compositions of the sintered magnets produced in Examples 4 to 7 are shown in Table 2.

It was confirmed by subjecting the textures (the produced phases after the aging heat treatment) of the sintered magnets produced as described above to TEM observation that all of them had a two-phase separated texture of an intragranular phase having a 2-17 type crystal phase and a grain boundary phase. The intragranular phase and the grain boundary phase were measured for a Cu concentration to find that a ratio of Cu concentration (C2) of the grain boundary phase to Cu concentration (C1) of the intragranular phase was 1.2 or more. These sintered magnets were subjected to the characteristic evaluation to be described later.

Comparative Example 2

A sintered body was produced under the same conditions as in Example 5 by using the alloy powder having the same composition as in Example 5. The sintered body was held at 850° C. for 9 hours and cooled slowly to 400° C. at a cooling rate of 0.7° C./min to produce a sintered magnet.

The above-described sintered magnets of Examples 1 to 7 and Comparative Examples 1 and 2 were observed for their textures by TEM, and the average thickness of grain boundary phase was measured by the above-described method. And, a Lorentz TEM observation was performed to measure the thickness of the magnetic domain wall according to the above-described method. The sintered magnets were evaluated for magnetic characteristics by using a BH tracer, and residual magnetization Br and coercive force iHc were measured. Average thickness, magnetic domain wall thickness and magnetic characteristics of the above-evaluated grain boundary phase are also shown in Table 1.

for 4 hours to produce a sintered body. The obtained sintered body was held at 820° C. for 4 hours and cooled slowly to 600° C. at a cooling rate of 1.2° C./min to produce a target sintered magnet. The compositions of the sintered magnets produced in Examples 8 and 9 are shown in Table 2.

The above-produced sintered magnets were undergone TEM observation for their textures (the produced phases after the aging heat treatment) to find that they have a two-phase separated texture of an intragranular phase having a 2-17 type crystal phase and a grain boundary phase. The intragranular phase and the grain boundary phase were measured for a Cu concentration to find that a ratio of Cu concentration (C2) of the grain boundary phase to Cu concentration (C1) of the intragranular phase is 1.2 or more. These sintered magnets were subjected to the characteristic evaluation to be described later.

Comparative Example 3

A sintered body was produced under the same conditions as in Example 9 by using the alloy powder having the same composition as in Example 9. The sintered body was held at 920° C. for 4 hours and cooled slowly to 600° C. at a cooling rate of 1.2° C./min to produce a sintered magnet.

Examples 10 to 12

Ingots obtained by arc-melting individual raw materials in an Ar gas atmosphere were put into individual quartz

TABLE 1

| | Composition of sintered magnet | Thickness of grain boundary phase [nm] | Thickness of magnetic domain wall [nm] | Residual Magnetization Br [T] | Coercive force iHc [kA/m] |
| --- | --- | --- | --- | --- | --- |
| E1 | $Sm(Fe_{0.40}Zr_{0.04}Cu_{0.05}Co_{0.51})_{7.5}$ | 2 | 7 | 1.21 | 215 |
| E2 | $Sm(Fe_{0.32}(Ti_{0.1}Zu_{0.9})_{0.04}Cu_{0.06}Co_{0.58})_{8.2}$ | 6 | 8 | 1.18 | 300 |
| E3 | $(Sm_{0.95}Ce_{0.05})(Fe_{0.36}Zr_{0.02}Cu_{0.08}Co_{0.54})_{7.8}$ | 2 | 9 | 1.20 | 250 |
| E4 | $(Sm_{0.9}Nd_{0.1})(Fe_{0.33}(Ti_{0.4}Zr_{0.6})_{0.03}Cu_{0.08}Co_{0.58})_{8.0}$ | 3 | 8 | 1.20 | 280 |
| E5 | $Sm(Fe_{0.3}Zr_{0.03}Cu_{0.06}Co_{0.61})_{7.6}$ | 8 | 10 | 1.24 | 310 |
| E6 | $Sm(Fe_{0.31}(Ti_{0.2}Zr_{0.8})_{0.04}Cu_{0.05}Co_{0.58})_{7.5}$ | 6 | 9 | 1.21 | 320 |
| E7 | $Sm(Fe_{0.28}(Ti_{0.1}Zr_{0.9})_{0.02}Cu_{0.05}Co_{0.65})_{7.5}$ | 8 | 12 | 1.19 | 340 |
| CE1 | $Sm(Fe_{0.32}(Ti_{0.1}Zr_{0.9})_{0.04}Cu_{0.06}Co_{0.58})_{8.2}$ | 15 | 8 | 1.10 | 570 |
| CE2 | $Sm(Fe_{0.3}Zr_{0.03}Cu_{0.06}Co_{0.61})_{7.6}$ | 17 | 7 | 1.05 | 590 |

E1, E2, E3, E4, E5, E6, E7 = Example 1, Example 2, Example 3, Example 4, Example 5, Example 6, Example 7
CE1, CE2 = Comparative Example 1, Comparative Example 2

It is apparent from Table 1 that both the samples subjected to the aging heat treatment for 4 hours or less and the samples subjected to cooling at the cooling rate of 1.2° C./min or more have a grain boundary phase thickness of 10 nm or less and a coercive force of 200 to 340 kA/m. Meanwhile, both the samples subjected to the aging heat treatment for 9 hours or more and the samples subjected to cooling at the cooling rate of 0.8° C./min or less have a grain boundary phase thickness of exceeding 10 nm and a coercive force of 550 kA/m or more.

Examples 8 and 9

Ingots obtained by arc melting individual raw materials in an Ar gas atmosphere were heated at 1170° C. for 1 hour. The obtained alloy was coarsely crushed and then finely ground by a jet mill to prepare an alloy powder. The alloy powder was pressed in a magnetic field to prepare a green compact, which was then sintered in an Ar gas atmosphere at 1190° C. for 2 hours, and subsequently heated at 1170° C.

nozzles and melted by applying high frequency induction heating. Each molten metal was poured onto a cooling roll rotating at a circumferential velocity of 0.6 m/sec to produce a thin strip by continuously solidifying. The thin strip was coarsely crushed and then finely ground by a jet mill to prepare an alloy powder. The alloy powder was pressed in a magnetic field to prepare a green compact, which was then sintered in an Ar gas atmosphere at 120° C. for one hour, and subsequently heated at 1180° C. for 4 hours to produce a sintered body. The obtained sintered body was held at 830° C. for 3 hours and cooled slowly to 650° C. at a cooling rate of 1.3° C./min to produce a target sintered magnet. The compositions of the sintered magnets produced in Examples 10 to 12 are shown in Table 2.

It was confirmed by subjecting the textures (the produced phases after the aging heat treatment) of the sintered magnets produced as described above to TEM observation that all of them had a two-phase separated texture of an intragranular phase having a 2-17 type crystal phase and a grain boundary phase. The intragranular phase and the grain boundary phase were measured for a Cu concentration to find that a ratio of Cu concentration (C2) of the grain boundary phase to Cu concentration (C1) of the intragranular phase was 1.2 or more. These sintered magnets were subjected to the characteristic evaluation to be described later.

Comparative Example 4

A sintered body was produced under the same conditions as in Example 11 by using the alloy powder having the same composition as in Example 11. The sintered body was held at 880° C. for 12 hours and cooled slowly to 650° C. at a cooling rate of 1.3° C./min to produce a sintered magnet.

Comparative Example 5

A sintered body was produced under the same conditions as in Example 12 by using the alloy powder having the same composition as in Example 12. The sintered body was held at 880° C. for 12 hours and cooled slowly to 650° C. at a cooling rate of 1.3° C./min to produce a sintered magnet.

The sintered magnets of the above-described Examples 8 to 12 and Comparative Examples 3 to 5 were observed for their textures by TEM, and the concentration ratio (M2/M1) of the element M was measured by the above-described method. The magnetic characteristics of the sintered magnets were evaluated by a BH tracer, and residual magnetization Br and coercive force iHc were measured. The concentration ratio (M2/M1) of the element M and magnetic characteristics evaluated as described above are also shown in Table 2. For Example 12 and Comparative Example 5, the average thickness and magnetic domain wall thickness of the grain boundary phase were also measured by the above-described methods.

Example 5, the average thickness of the grain boundary phase was larger than the magnetic domain wall thickness, and the coercive force was 600 kA/m.

The permanent magnet according to the above embodiments can be used effectively as a variable magnet. In addition, the permanent magnet as the variable magnet can be used effectively for the variable magnetic flux motor and the variable magnetic flux electric generator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A permanent magnet comprising a sintered body, the sintered body comprising:
   a composition expressed by a composition formula:

$Sm(Fe_pM_qCu_r(Co_{1-a}A_a)_{1-p-q-r})_z$ where,
   M is at least one element selected from the group consisting of Ti, Zr and Hf,
   A is at least one element selected from the group consisting of Ni, V, Cr, Mn, Al, Si, Nb, Ta and W,
   p is a number of atomic ratio satisfying $0.26 \leq p \leq 0.5$,
   q is a number of atomic ratio satisfying $0.005 \leq q \leq 0.1$,
   r is a number of atomic ratio satisfying $0.01 \leq r \leq 0.15$,
   a is a number of atomic ratio satisfying $0 \leq a \leq 0.2$,
   z is a number of atomic ratio satisfying $7 \leq z \leq 9$; and

TABLE 2

| | Composition of sintered magnet | M2/M1 | Thickness of grain boundary phase [nm] | Thickness of magnetic domain wall [nm] | Residual Magnetization Br [T] | Coercive force iHc [kA/m] |
|---|---|---|---|---|---|---|
| E8 | $Sm(Fe_{0.38}Zr_{0.04}Cu_{0.055}Co_{0.525})_{7.6}$ | 1.24 | — | — | 1.20 | 200 |
| E9 | $Sm(Fe_{0.29}(Ti_{0.1}Zr_{0.9})_{0.04}Cu_{0.05}Co_{0.62})_{8.2}$ | 1.55 | — | — | 1.17 | 280 |
| E10 | $(Sm_{0.8}Nd_{0.2})(Fe_{0.31}Zr_{0.02}Cu_{0.08}Co_{0.59})_{7.8}$ | 1.52 | — | — | 1.21 | 220 |
| E11 | $Sm(Fe_{0.3}Zr_{0.025}Cu_{0.055}Co_{0.62})_{7.6}$ | 1.58 | — | — | 1.20 | 300 |
| E12 | $Sm(Fe_{0.28}(Ti_{0.25}Zr_{0.75})_{0.06}Cu_{0.05}Co_{0.61})_{7.5}$ | 1.67 | 7 | 10 | 1.18 | 310 |
| CE3 | $Sm(Fe_{0.29}(Ti_{0.1}Zr_{0.9})_{0.04}Cu_{0.05}Co_{0.62})_{8.2}$ | 2.88 | — | — | 1.01 | 575 |
| CE4 | $Sm(Fe_{0.3}Zr_{0.025}Cu_{0.055}Co_{0.62})_{7.6}$ | 3.55 | — | — | 0.95 | 600 |
| CE5 | $Sm(Fe_{0.28}(Ti_{0.25}Zr_{0.75})_{0.06}Cu_{0.05}Co_{0.61})_{7.5}$ | 3.55 | 15 | 11 | 0.95 | 600 |

E8, E9, E10, E11, E12 = Example 8, Example 9, Example 10, Example 11, Example 12
CE3, CE4, CE5 = Comparative Example 3, Comparative Example 4, Comparative Example 5

It is apparent from Table 2 that the concentration ratio (M2/M1) of the element M was 2 or less and the coercive force was 200 to 350 kA/m in the samples having a high maintenance temperature of less than 900° C. during the aging treatment and the samples having high temperature maintaining time of 4 hours or less. On the other hand, the concentration ratio (M2/M1) of the element M was larger than 2 and the coercive force was 550 kA/m or more in the samples having a high maintenance temperature of 900° C. or more during the aging treatment and the samples having high temperature maintaining time of 12 hours or more. In Example 12, the average thickness of the grain boundary phase was smaller than the magnetic domain wall thickness, and the coercive force was 350 kA/m, and in Comparative a structure including an intragranular phase having a $Th_2Zn_{17}$ crystal phase and a grain boundary phase,
wherein a ratio (M2/M1) of an atomic concentration M2 of the element M to an atomic concentration M1 of the element M is 2 or less and greater than one,
wherein M1 is the lowest atomic concentration of the element M of 50 arbitrary points each having a radius of 2 nm in a transmission electron microscope (TEM) image magnified to 100 k to 200 k times of a cross section including axis c of the $Th_2Zn_{17}$ crystal phase,
wherein M2 is the highest atomic concentration of the element M of the 50 arbitrary points each having a radius of 2 nm in a transmission electron microscope (TEM) image magnified to 100 k to 200 k times of a cross section including axis c of the $Th_2Zn_{17}$ crystal phase, and wherein a coercive force of the permanent magnet is in a range of 200 kA/m to 500 kA/m.

2. The permanent magnet according to claim 1, wherein a ratio (C2/C1) is 1.2 or more, wherein C2 is the average Cu atomic concentration in the grain boundary phase of 50 arbitrary points in a transmission electron microscope (TEM) image magnified to 100 k to 200 k times of a cross section; and wherein C1 is the average Cu atomic concentration in the intragranular phase of 50 arbitrary points in a transmission electron microscope (TEM) image magnified to 100 k to 200 k times of a cross section.

3. The permanent magnet according to claim 2, which has a coercive force in the range of 200 kA/m to 400 kA/m.

4. A variable magnetic flux motor comprising as a variable magnet the permanent magnet according to claim 1.

5. A variable magnetic flux electric generator comprising as a variable magnet the permanent magnet according to claim 1.

6. The permanent magnet according to claim 1, wherein the coercive force of the permanent magnet is in a range of 200 kA/m to 400 kA/m.

7. The permanent magnet according to claim 1, wherein the intragranular phase has an average crystal grain diameter in a range of 20 nm to 500 nm, and the grain boundary phase has an average thickness smaller than a magnetic domain wall thickness.

8. The permanent magnet according to claim 7, wherein the average thickness of the grain boundary phase is in a range of 1 nm to 10 nm.

9. The permanent magnet according to claim 7, wherein the average thickness of the grain boundary phase is in a range of 2 nm to 8 nm, and the magnetic domain wall thickness is in a range of 7 nm to 12 nm.

10. The permanent magnet according to claim 1, wherein the grain boundary phase has a $CaCu_5$ crystal phase.

11. The permanent magnet according to claim 1, wherein the M2/M1 ratio is 1.24 or more and 2 or less.

12. The permanent magnet according to claim 1, wherein 50 at. % or more of the element M is zirconium.

13. The permanent magnet according to claim 1, wherein M comprises Zr.

14. The permanent magnet according to claim 1, wherein M is Zr.

15. The permanent magnet according to claim 1, wherein q is a number of atomic ratio satisfying $0.01 \leq q \leq 0.06$.

16. The permanent magnet according to claim 1, wherein a is 0.

17. The permanent magnet according to claim 1, wherein the M2/M1 ratio is greater than one and 1.8 or less.

18. The permanent magnet according to claim 1, wherein the M2/M1 ratio is greater than one and 1.6 or less.

* * * * *